May 3, 1932. E. E. McNALLY Re. 18,448
GELATIN BAND SPINDLE
Original Filed April 18, 1928
Fig. 1
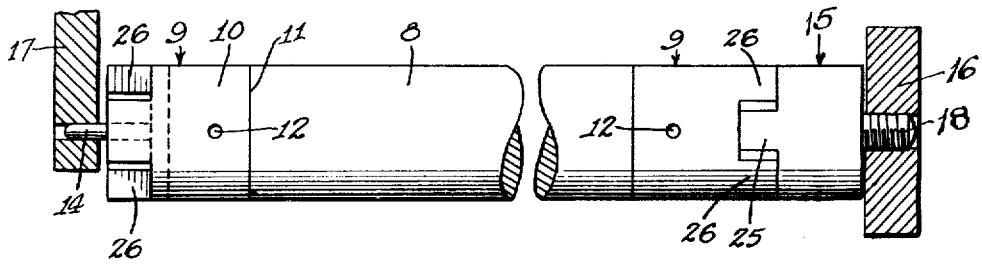
Fig. 2
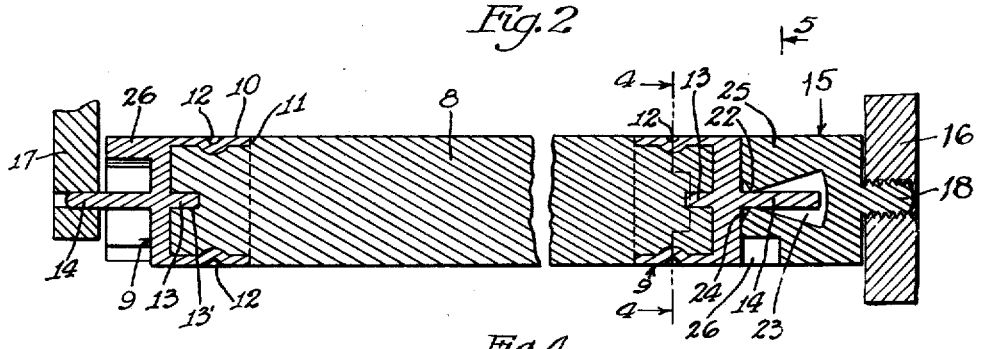
Fig. 3
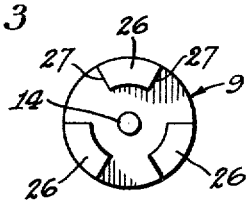
Fig. 4
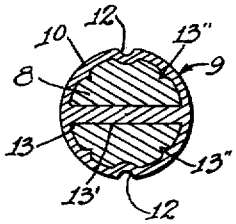
5
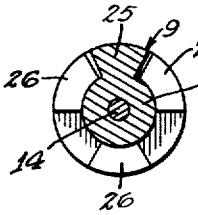
Fig. 5
Fig. 6
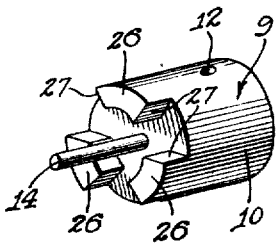
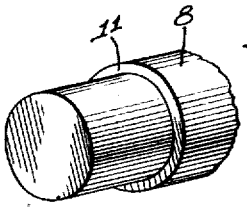
Fig. 7
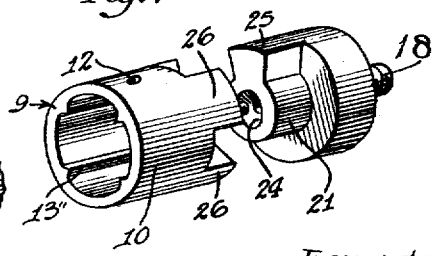
Inventor:
Edward E. McNally
By: Wm. O. Belt
Atty.

Reissued May 3, 1932

Re. 18,448

UNITED STATES PATENT OFFICE

EDWARD E. McNALLY, OF CHICAGO, ILLINOIS

GELATIN BAND SPINDLE

Original No. 1,742,270, dated January 7, 1930, Serial No. 270,875, filed April 18, 1928. Application for reissue filed January 2, 1932. Serial No. 584,538.

This invention relates to gelatin band spindles for hectograph duplicating machines and its object is to provide a novel and improved spindle adapted to be readily and easily mounted in a machine and to be engaged with carrier devices for storing the roll.

A further and important object of the invention is to provide a strong and substantial spindle comprising a body made of wood or other light material and provided with metal journal end members permanently and rigidly secured to the body so that they will not twist or turn relatively to the body in service.

And a further object of the invention is to provide an adapter for enabling the spindle to be used in a variety of machines.

In the accompanying drawings illustrating a selected embodiment of the invention, Fig. 1 shows the spindle mounted in parts of a machine shown in section.

Fig. 2 is a sectional view through the spindle, the adapter and the parts of the machine in which they are mounted.

Fig. 3 is an end view of the left end member of the spindle in Figs. 1 and 2.

Figs. 4 and 5 are transverse sectional views on the lines 4—4 and 5—5 respectively of Fig. 2.

Fig. 6 is a perspective view showing the left end of the body and the metal journal end member to be engaged therewith.

Fig. 7 is a perspective view showing the right metal journal end member and the adapter.

Referring to the drawings, 8 is the body of the spindle which may be made of wood or other light material and of a suitable size. The body is provided with metal journal end members 9, 9, which are preferably made alike. Each journal end member 9 has a socket portion 10 to receive an end of the body which is reduced to form a peripheral shoulder 11 to abut the socket wall, whereby the end member will lie flush with the body and present a smooth surface to receive the gelatin band. The end member is secured on the end of the body against relative rotative movement by any or all of the following means:—The side wall of the end member may be indented at any place or places, as at 12, to clamp the body; the bottom of the socket may be provided with a transverse rib 13 to engage a corresponding groove 13′ in the end of the body; or one or more sharpened ribs or projections of suitable size may be provided on the inside of the socket wall to cut into the body 8 when the end member and the body are engaged. The rib and groove are preferred because they will absolutely insure against relative rotative movement of the body and end member, but the sharpened ribs or projections 13″ constitute a satisfactory interlocking means for many purposes; and the indentations 12 are a desirable feature since they can be easily made to press into the wood body and prevent relative rotative and also relative longitudinal movement of the body and end member. There is often considerable rotative strain on the spindle and heretofore it has not been uncommon to find the body rotating relatively to the end members of the spindle, but there is little tendency of the body and end members to loosen or separate longitudinally, therefore it will be found sufficient ordinarily to provide the rib and groove for preventing relative rotative movement and one or more indentations like, or similar to 12 to prevent relative endwise movement.

I prefer to make the end members alike so that they can be used interchangeably in the supporting parts of a machine or of a storage carrier and I provide each end member with an elongated journal 14 which projects beyond the other parts of the end member and is adapted to engage supporting parts in the machine or the storage carrier.

In Figs. 1 and 2, the journal at the left of the spindle is shown engaged with an adapter 15 including a screw-threaded stem 18 fast in a member 16 which is rotatably mounted in the machine frame (not shown) or the like. Unitary with the adapter 15 is a centrally located boss 21 projecting axially from the adapter and an opening 22 extends through the boss and into the main body of the adapter and is enlarged as at 23 and the outer end of the opening is countersunk as at 24.

Extending outwardly from the boss 21 is a lug 25 and the sides of this lug extend radially from the boss. Projecting axially from the ends of the end members 9 at the periphery thereof and spaced from the elongated journals or center pins 14 are lugs 26. These lugs are spaced from each other and when the center pin 14 is passed through the opening 22, the lug 25 fits between adjacent lugs 26 which are circumferentially spaced from each other. I prefer to provide three lugs 26 for then when the lug 25 is fitted between adjacent lugs 26 and the adapter 15 is rotated in either direction the lug 25 is so disposed relative to two lugs 26 that the spindle will start to turn at once. However, the end members 9 need have but one lug for the adapter 15 may be rotated in either direction and the lug 25 sooner or later will engage the single lug 26 and cause rotation of the spindle. Thus, while the provision of three lugs is advantageous one or more lugs may be provided without departing from the purview of my invention.

The invention provides a strong and substantial spindle for gelatin bands which is adapted to be readily and quickly engaged with and disengaged from the parts of a duplicating machine for supporting the spindle, and also with a carrier in which the gelatin band roll is stored when not in use. I prefer to dispose the sides 27 of the lugs radially of the spindle to make the spaces between the lugs as wide as possible at the periphery of the spindle where they will be first engaged with supporting parts. Furthermore, since the sides of the lugs 26 are in radial planes the sides of the lug 25 will neatly fit thereagainst to provide a good driving connection between the lugs 25 and 26. I have provided strong and substantial metal journal ends and novel means for securing these ends on the body because I know that in practice it not infrequently happens that the journal ends are broken or distorted in use or in handling and work or are forced sufficiently free to revolve on the body or to permit the body to revolve relative thereto. The journal ends of my invention are strong and substantial and are rigidly and permanently secured to the body.

I have shown the invention in a preferred form adapted for commercial use, but I reserve the right to make changes in the construction and arrangement of parts within the scope of the following claims.

I claim:

1. A spindle for gelatin band rolls having a body, and end members rigidly mounted on the ends of the body and each having a centrally disposed journal and a plurality of outwardly projecting peripheral lugs spaced apart and spaced from said centrally disposed journal.

2. A spindle for gelatin band rolls having a body, and end members rigidly mounted on the ends of the body and each having a plurality of outwardly projecting spaced peripheral lugs and a centrally disposed journal projecting from the end member beyond the lugs and radially spaced from said lugs.

3. A spindle for gelatin band rolls having a body, and end members rigidly mounted on the ends of the body and each having a plurality of spaced lugs projecting in the direction of the length of the spindle at the periphery thereof, the opposing sides of the lugs being disposed radially of the spindle.

4. A spindle for gelatin band rolls having a body, and an end member having a socket into which an end of the body is inserted, the bottom of said socket and the end of said body having a rib and groove engagement to prevent relative rotative movement of the end member and body.

5. A spindle for gelatin band rolls having a body, and an end member mounted on an end of the body, said member having a socket into which an end of the body is inserted, and the inner wall of the socket being provided interiorly with a longitudinal sharpened rib to take into the body when the body is forced into the socket and to prevent relative rotative movement of the end member and body.

6. A spindle for gelatin band rolls having a body, and an end member mounted on an end of the body, said member having a socket into which an end of the body is inserted, the bottom of said socket and the end of said body having a rib and groove engagement, said socket being provided on its inner wall with a longitudinal sharpened rib to take into the body when the body is forced into the socket to prevent relative rotative movement of the end member and body.

7. A spindle for gelatin band rolls having a body, and an end cap member mounted on an end of the body, said end cap member forming a socket into which an end of the body is inserted, the inner wall of said socket being provided with a longitudinally disposed sharpened rib embedded into the body and said wall being indented into the body to secure the end member rigidly on the body against relative rotative and longitudinal movement thereon.

8. A spindle for gelatin band rolls having a body, and an end member mounted on an end of the body, said end member having a socket to receive an end of the body, the bottom of said socket and the end of said body having a rib and groove engagement, and the wall of said socket being provided interiorly with a sharpened rib to take into the body when the body is forced into the socket and said wall being indented in to the body to secure the end member rigidly on the body against relative movement thereon.

9. The combination of a journal support having a lug thereon, a gelatin band roll spindle, a journal at an end of the spindle to engage said support, and a plurality of outwardly projecting spaced peripheral lugs arranged about and spaced from the journal on the end of the spindle and adapted for engagement with said lug on the support.

10. The combination of a gelatin band roll spindle having a plurality of outwardly projecting spaced peripheral lugs and a centrally disposed journal at an end of the spindle, and an adapter having a threaded stud to engage a support, a lug to engage a space between two of the lugs on the spindle, and means providing an opening to receive the journal.

11. In a spindle for a gelatin band roll, a body, an end member rigidly mounted on one end of the body and having a plurality of outwardly projecting spaced peripheral lugs, and a centrally disposed journal projecting from the end member and radially spaced from said lugs.

12. In a spindle for a gelatin band roll, a body, an end member rigidly mounted at one end of the body and having a centrally disposed journal projecting axially therefrom, and a peripheral lug projecting parallel to the journal and radially spaced therefrom.

13. In a spindle for a gelatin band roll, a body, an end member rigidly mounted at one end of the body and having a centrally disposed journal projecting axially therefrom, and a lug projecting parallel to the journal and radially spaced therefrom and having the opposite sides thereof disposed radially of the spindle.

14. In a spindle for a gelatin band roll, a body, an end member rigidly mounted at one end of the body and having a centrally disposed journal projecting axially therefrom, a driving lug integral with said end member and independent of and spaced from said journal and having the opposite sides thereof disposed radially of the spindle, said journal projecting beyond said driving lug to facilitate insertion of the journal in a support therefor and to facilitate engagement of the driving lug with a driving member.

15. In a spindle for a gelatin band roll, a body, an end member rigidly mounted at one end of the body and having an integral centrally disposed journal projecting axially therefrom, and an integral lug projecting parallel to the journal and radially spaced therefrom, the opposite sides of the lug being disposed radially of the spindle.

16. In a spindle for a gelatin band roll, a body, an end member rigidly mounted at one end of the body and having a centrally disposed journal projecting axially therefrom, and a peripheral lug projecting parallel to the journal and radially spaced therefrom, the opposite sides of the lug being disposed radially of the spindle.

17. In a winding device for a gelatin band roll which has a driving member including an adapter having an axial opening extending thereinto from the free end thereof, and a lug on the free end of said adapter, the combination therewith of a spindle on which the band is wound, said spindle including a body, an end member rigidly mounted at one end of the body and having a centrally disposed journal projecting axially therefrom and adapted to be inserted into the opening in said adapter, a lug on said end member adapted to be engaged by the lug on said adapter whereby when said driving member is rotated the lug on said adapter will engage the lug on said end member to transmit the rotation of said driving member to said spindle, and means for rotatably supporting the other end of the spindle.

18. In a winding device for a gelatin band roll which has a driving member including an adapter having an axial opening extending thereinto from the free end thereof, and a lug on the free end of said adapter, the opposite sides of said lug being disposed radially of the adapter, the combination therewith of a spindle on which the band is wound, said spindle including a body, an end member rigidly mounted at one end of the body and having a centrally disposed journal projecting axially therefrom and adapted to be inserted into the opening in said adapter, a lug on said end member and having the opposite sides thereof disposed radially of the end member whereby when a radial side of the lug on the adapter engages a radial side of the lug on the end member rotative movement imparted to said driving member will be transmitted to said spindle, and means for supporting the other end of the spindle.

EDWARD E. McNALLY.

CERTIFICATE OF CORRECTION.

Reissue Patent No. 18,448. May 3, 1932.

EDWARD E. McNALLY.

It is hereby certified that the above numbered patent was erroneously issued to the inventor said "McNally", whereas said patent should have been issued to John J. Flanigan, of Oak Park, Illinois, as assignee of the entire interest in said invention, as shown by the records of assignments in this office; and that the said Letters Patent should be read with this correction therein that the same may conform to the record of the case in the Patent Office.

Signed and sealed this 12th day of July, A. D. 1932.

M. J. Moore,
Acting Commissioner of Patents.

(Seal)